June 17, 1952     C. E. SLAUGHTER     2,600,438
CONTAINER
Filed Oct. 25, 1946
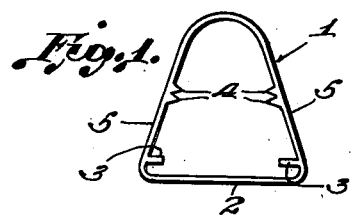
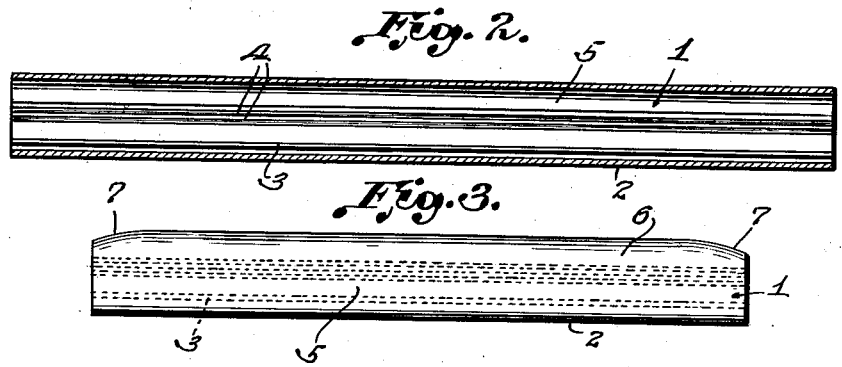
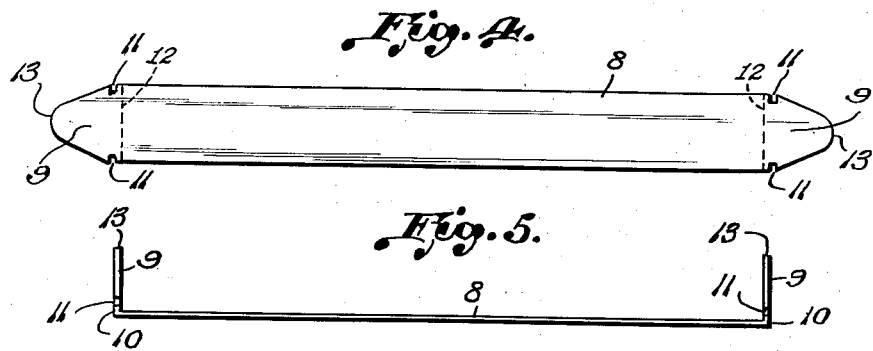
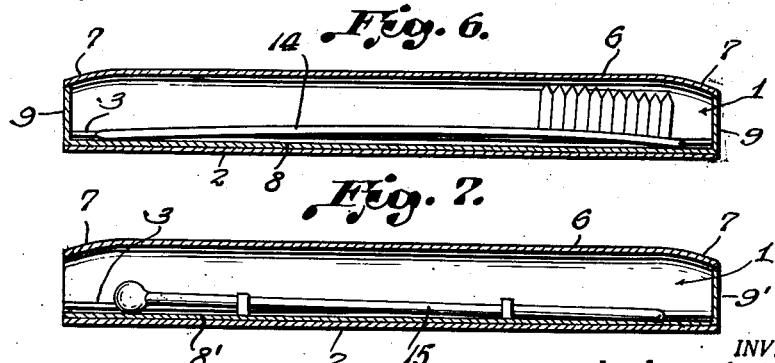
INVENTOR.
Charles E. Slaughter
BY
Sol Shappirio
ATTORNEY.

Patented June 17, 1952

2,600,438

UNITED STATES PATENT OFFICE 2,600,438

CONTAINER

Charles E. Slaughter, New Canaan, Conn.

Application October 25, 1946, Serial No. 705,550

1 Claim. (Cl. 206—45.34)

This invention relates to containers and methods of making the same and more particularly to containers of inexpensive character produced from tubular sections having closure forming inserts.

There is a tremendous demand in industry for containers and packaging material of inexpensive character that may be readily produced in large quantities at lost cost.

Among the objects of the present invention is the production of inexpensive containers from plastic tubular sections with inserts desirably of dissimilar material from that of the plastic section, which insert carries the closure to produce the container from the section.

Other objects include methods of producing such containers.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

In connection with that more detailed description, there is shown in the accompanying drawing, in Figure 1, an end view of one form of tubular section utilized in making containers; in Figure 2, a longitudinal section of Figure 1; in Figure 3, a side elevation of tubular section used as the casing for containers; in Figure 4, a blank utilized for the insert for the section of Figures 1 to 3; in Figure 5, a view of the blank of Figure 4 with the ends angularly bent to the body portion; in Figure 6, a transverse section through a container produced in accordance with the present invention; and in Figure 7, a transverse section through a modified form of container produced in accordance with the present invention.

In accordance with the present invention, containers are produced desirably from two elements, one being a casing of tubular section and the other being an insert of material desirably different from that of the tubular section, and relatively inexpensive, such as cardboard, coated paper, Celluloid or other plastic, etc., which insert carries portions to form closures for the tubular section.

The casing element of tubular section may be of any desired cross-sectional contour such as round, oval, triangular, etc., desirably provided with a flattened face to act as a base section. Such tubular section is desirably made by extrusion processes producing continuous lengths of such tubular section which may be cut to the desired length for the particular container in hand.

Such tubular section may be extruded from any desired thermoplastic material, particularly thermoplastic synthetic resinous materials, including cellulose derivatives, such as the esters and ethers, for example, cellulose acetate, cellulose nitrate, cellulose acetate butyrate, ethel cellulose, benzyl cellulose, etc.; vinyl polymers and copolymers, including polymerized vinyl acetate, polymerized vinylidene chloride, and copolymers of vinyl chloride and vinyl acetate; polymerized styrenes, methacrylate and methyl methacrylate resins; polyethylenes; nylon type resins; etc.

As illustrated in Figures 1 and 2 of the drawing, the casing may be an extruded tubular section having a more or less ovate deltoid cross-sectional configuration 1 with a flattened face 2 to act as a base portion. Desirably the tubular section is provided with longitudinal internal ribs 3, 3, which project inwardly from the inner wall of the section for a short distance, which ribs are desirably placed near the flattened face 2 for purposes hereinafter set forth. It is simple matter to produce such internal ribs longitudinally on the section at the time of extrusion. If desired, faceting ribs 4, 4 may be provided on the side walls 5, 5 of the section for producing light reflection, particularly where such faceting ribs are angular. But such faceting ribs are unnecessary in producing containers except for an ornamental or identifying purpose.

From continuous lengths of such extruded sections as that illustrated in Figures 1 and 2, discrete lengths such as 6, Figure 3, may be cut of the length necessary for the particular container, and during such cutting operation, the ends 7, 7 of the section furthest from the base 2 may be depressed or deformed for purposes hereinafter set forth.

The element used to produce closures for the section such as that of Figures 1 to 3, to produce a container from the latter may take the form of any desired blank of cardboard, coated paper, plastic such as Celluloid or other material having end portions adapted to be angularly bent with respect to the body portion of the blank, which end portions are given a contour simulating that of the internal cross-section of the casing. As shown in Figure 4, such insert may have an elongated rectangular body portion 8, provided with ends 9, 9 of ovate deltoid form simulating the cross-section of the tubular section of Figures 1 to 3. The ends 9, 9 of the blank of Figure 4 are adapted to be bent angularly, for example, at right angles as shown at 10, 10, Figure 5, and the ends 9, 9, may be provided with notches 11, 11, positioned on the ends near the body portion 8 at points where when the insert is placed within the section of Figures 1 to 3, the notches 11, 11 will engage against the ribs 3, 3, of the casing section. To facilitate bending the ends 9, 9 angularly with respect to the body portion 8, the blank may be scored as shown at 12, 12. The blank of Figure 4 is formed into the insert of Figure 5 by bending the ends 9, 9 angularly such as at right angles to the body portion 8.

To produce the container, the insert of Figure 5 is inserted within the tubular section of Figure 3, as shown assembled in Figure 6 with the ends 9, 9 of the insert of Figure 5 forming closures for the section of Figure 3, the ends of the sheet material of the closure forming elements being held rigidly in position by engagement of the notches 11, 11 against the ribs 3, 3 of the section and the engagement of the outer peripheral portions 13, 13 of the ends 9, 9 within the deformed or depressed ends 7, 7 of the section shown in Figure 3. Any article such as a tooth brush 14 placed on the body portion 8 of the insert before the latter is placed in position within the section of Figure 3, will thus be packaged simply and inexpensively in a container produced from two such elements all as more particularly shown in Figure 6.

Any types of articles may thus be packaged including tooth brushes, pencils, pens, thermometers, etc. Such articles may be attached by stapling or otherwise to the body portion 8 of the insert before the latter is placed in position to produce the final container.

If desired, the ends of the completed container as shown in Figure 6 may be dipped or coated with a sealing lacquer or other coating composition to insure sealing of the ends although this is not essential.

The insert may be provided with only one end sealing portion or closure forming element where one end of the finished container is to be open and this is illustrated in Figure 7 where the tubular section 1 similar to that of Figure 3 is provided with an insert 8' having one closure forming end 9' to which has been secured a thermometer element 15. The insert 8' is inserted into the section 1 as shown in Figure 7 with the end 9' of such insert forming a closure, the container being open at one end.

Containers and packages produced in accordance with the present invention are relatively inexpensive and may be thrown away after sale of the goods, particularly when produced from an extruded section as shown in Figure 3 and a cardboard or coated paper insert of the character shown in Figure 4. Further, while the notches 11, 11 on the insert of Figure 4 are desirably used together with ribs 3, 3 on the section of Figure 3, such notches and ribs may be omitted and containers produced, although a better locking and sealing effect is obtained with the structure shown. If desired, only one rib 3 may be used together with one pair of notches 11, 11 but the more desirable form of device is that shown in Figures 1–5.

The ribs 3, 3 are important because of the several functions they exhibit. They serve to guide the insert into its proper position when the parts are being assembled assuring the correct assembly and placement of the insert with respect to the casing, and once thus placed, the ribs retain the insert in its proper position locked rather securely against displacement. Further by thus positioning the insert they assure proper alignment of the ends 9, 9 with the ends of the casing and when the ends 9, 9 are formed into closure position, they are held rigidly in position by the ribs 3, 3 in the notches 11, 11.

Having thus set forth my invention, I claim:

A display container comprising an extruded open-ended tubular section of synthetic resinous material having a flattened base and walls converging above that base, a pair of opposite longitudinal discrete internal integral ribs near the base of the inner portions of said converging walls, said ribs projecting inwardly from the inner portions of the walls for a short distance, and a flat elongated rectangular insert serving as a display surface on which an article to be displayed may be placed, said ribs substantially contacting the upper edges of the insert and holding the insert slidably but securely in place within the container against the base by contact with said ribs.

CHARLES E. SLAUGHTER.

REFERENCES CITED

The following references are of record in the file of this patent:

UNITED STATES PATENTS

| Number | Name | Date |
|---|---|---|
| 749,359 | Butler | Jan. 12, 1904 |
| 1,362,820 | Rinker | Dec. 21, 1920 |
| 1,877,568 | Erl et al. | Sept. 13, 1932 |
| 1,881,316 | Horvath | Oct. 4, 1932 |
| 1,989,944 | Quigg | Feb. 5, 1935 |
| 2,419,745 | Trecek | Apr. 29, 1947 |
| 2,435,826 | Greene | Feb. 10, 1948 |

FOREIGN PATENTS

| Number | Country | Date |
|---|---|---|
| 221,766 | Switzerland | Jan. 4, 1943 |